United States Patent [19]

Hollenbach et al.

[11] 4,216,622
[45] Aug. 12, 1980

[54] PLANT CONTAINER

[76] Inventors: Roger C. Hollenbach, 20 Hodge Rd., Kendall Park, N.J. 08824; Howard U. Hackney, Jr., 24 Jefferson Dr., Flanders, N.J. 07836

[21] Appl. No.: 943,689

[22] Filed: Sep. 19, 1978

[51] Int. Cl.³ .......................... A01G 9/04; A01G 9/10
[52] U.S. Cl. ............................................. 47/71; 47/73
[58] Field of Search ............... 47/71, 73, 74, 85, 86, 47/87

[56] References Cited

U.S. PATENT DOCUMENTS

| | | | |
|---|---|---|---|
| 473,836 | 4/1892 | Goodacre | 47/73 |
| 610,156 | 8/1898 | Mechwart et al. | 47/73 |
| 1,655,731 | 1/1928 | May et al. | 47/73 |
| 3,195,272 | 7/1965 | Mosher et al. | 47/73 |
| 3,483,908 | 12/1969 | Donovan | 47/73 X |
| 3,991,516 | 11/1976 | Cicero | 47/73 X |
| 3,992,810 | 11/1976 | Kimball | 47/87 |
| 4,047,329 | 9/1977 | Holt | 47/74 X |
| 4,057,932 | 11/1977 | Spencer | 47/85 X |

FOREIGN PATENT DOCUMENTS

| | | | |
|---|---|---|---|
| 289885 | 10/1965 | Australia | 47/71 |
| 939512 | 1/1974 | Canada | 47/73 |

*Primary Examiner*—Edgar S. Burr
*Assistant Examiner*—James R. Feyrer
*Attorney, Agent, or Firm*—George F. Mueller

[57] ABSTRACT

A molded plant container having at least one slit along the vertical wall of the container, a separable liquid-tight fastener along the slit edges and a living hinge in a wall of the container permitting the side wall to be separated from a contained root ball. The bottom wall of the container may be provided with readily removable circular areas so as to adapt the container for use in air layering propagation of plants.

6 Claims, 6 Drawing Figures

PLANT CONTAINER

This invention relates to containers for horticultural plants and more particularly to containers or pots from which plants, after developing to a desired size, may be removed or transplanted readily without disturbing the root ball or harming the plant.

Conventionally, horticulturists, amateurs and householders have utilized the common clay or earthenware pots. In recent years the horticulture industry has adopted the use of thin walled molded synthetic resin pots in the propagation, growing on and marketing of plants. These inexpensive containers have partially replaced clay pots particularly in marketing seedlings and small plants. Purchasers allow the plants to grow in the original pots to a state where the plant has outgrown the particular size of the pot. Alternatively, the purchaser obtains the potted plant for placement in a garden plot. In order to remove a plant from these types of containers, it is necessary to up-end the pot and strike the rim of the pot against a rigid support such as a table or shelf while holding the plant to avoid injury to the plant. Sometimes a knife or other thin bladed device is used to separate the soil from the inner surface of the pot. During these operations, however, it is common that the root ball breaks and exposes the roots to the air thus shocking the plant and/or injuring the plant through stem or leaf breakage.

In the propagation of plants, especially woody or difficult-to-propagate varieties, by the air layering method, a well-developed stem or branch of the plant is selected which has a section of stem into the two or three year old wood. The bark is sliced or girdled on a short length of the stem or branch to make a wound down to the cambium layer. A complete girdling is generally preferred. Root promoting hormones may then be applied to the distal portion of the wounded stem or branch. Moist sphagnum moss or other rooting medium or combination of media is applied around the wounded area on the stem and the moss then covered with a plastic sheet. The plastic sheet is tightly bound about the stem above and below the wounded area. After roots have formed, the stem or branch is severed from the plant, the plastic sheet removed and so much of the moss as adhered around the roots allowed to remain and the new plant inserted into soil. Because of the necessity of removing the plastic sheet, in many instances some of the moss becomes dislodged and results in a shock to the plant because the roots dry out from the exposure to the air.

A valuable extension and alternative application of the air layering procedure may be utilized by the professional horticulturist or householder for plants which, by their natural growth habits or improper maintenance including incorrect nutrition, has grown leggy, that is, the plant has grown tall losing its lower leaves and/or branches. Typically, such unattractive, long-stemmed plants are discarded because of the great effort to salvage them by traditional means, such as attempting to root the woody stems, and the typically high incidence of failure associated with propagation of more mature woody plant stems and branches.

One of the purposes of this invention is to provide a plant container from which a plant and root ball may be removed readily without a breaking of the root ball.

A further purpose of the invention is to provide a plant container which may be reused after a plant is removed therefrom.

Another purpose of the invention is to provide a plant container which is inexpensive, may be provided with desired decorations and may be used as a permanent or temporary container for a plant.

It is a further purpose of the invention to provide a plant container which is adapted for the propagation of plants by the air layering method.

It is a still further purpose of the invention to provide a plant container which may be employed to salvage leggy, long-stemmed plants by an adaptation of the air layering method of propagation.

Other objects and advantages of the invention will become apparent from a consideration of the description which follows taken in conjunction with the accompanying drawings wherein.

The present invention comprises a molded container split along at least one vertical side, a separable liquid-tight clasp or fastener along the slit edges and having an integral hinge permitting the sides to be separated from the root ball without disturbing the same. In order to adapt the container for air layering propagation purposes, the bottom wall of the container may be modified and provided with concentric rings defined by lines having a lesser thickness than the bottom wall whereby the defined rings may be removed or knocked out readily to provide openings for reception of a plant stem or branch.

Figure 1:
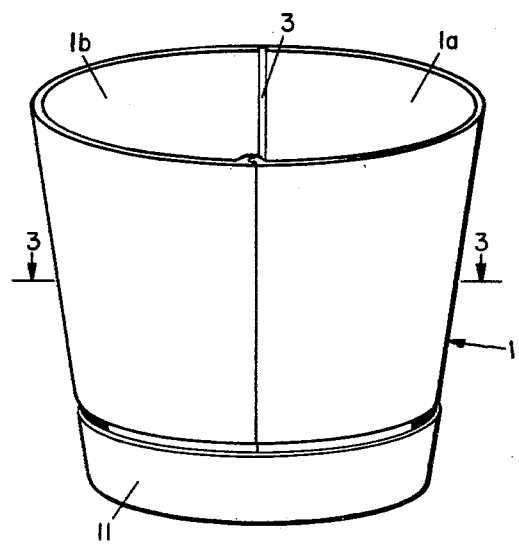
FIG. 1 is a perspective view of the container in assembled condition.
Figure 2:
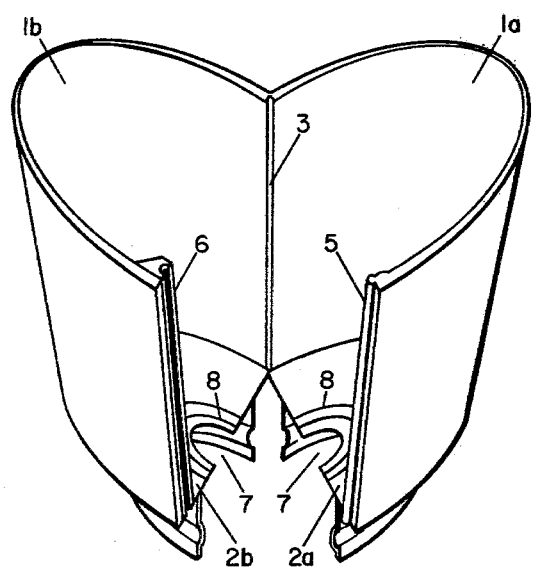
FIG. 2 is a perspective view showing the container in open condition.

As illustrated in FIGS. 1 and 2, the container is in the general configuration of conventional clay pots having a cylindrical or conical vertical wall 1 and an integral bottom wall 2. The container may be molded as by injection or blow molding or other suitable technique. Any of the flexible thermoplastic materials, such as, for example, polyethylene, polypropylene, polyvinyl chloride and the like, are satisfactory. The wall along one vertical side is of lesser thickness as at 3 and is so formed that the polymer molecules orient themselves in a direction perpendicularly to the length of the area 3 so as to provide a strong hinge, commonly termed a "living hinge".

Opposite the hinge 3 the wall of the container is split so as to form semi-cylindrical sections 1a and 1b. The split edges are provided with a separable interengaging coupling or fastener 4 along at least the major portion of the vertical split edges. One of the slit edges is formed with an outwardly extending cylindroid bead 5 while the opposed slit edge is formed with a cooperating cylindroid channel or groove 6. The dimension of the entrance to the channel or groove or the dimension between the lips is slightly smaller than the diameter of the bead. Hence, the bead may be pressed into the channel and is retained therein by the lips of the channel or groove. The coupling forms a liquid-tight closure that maintains the semi-cylindrical sections in closed relationship.

The bottom wall 2 is formed integrally with the side wall and is divided into semi-circular sections 2a and 2b defined by a slit extending from hinge 3 to the slit in the vertical wall. The bottom wall 2 is formed with a centrally located drainage port 7. A plurality of concentric rings 8 may be molded into the bottom wall 2 so as to provide circular areas which may be removed or pressed-out readily. By removing an appropriate circular area the container is adapted to receive a stem or branch of a plant in the air layering technique. Following the removal of the circular area, the branch is positioned in the opening, the container closed and moist moss placed in the container. A tubular base 9 projects downwardly from the bottom wall 2 and is formed with an annular flute 10 in its exterior surface.

A cup-shaped tray 11 is provided into which the container may be placed. The wall 12 of the tray may have the same slope or taper as that of the wall 1 of the container. Tubular sectors 13 within the tray project upwardly from the bottom of the tray. The sectors are provided with a bead 14 on their internal surface. The internal diameter of the tubular sectors is somewhat greater than the internal diameter of the tubular base 9 so as to receive the tubular base. The thickness of the tubular sectors is sufficient to allow the sectors to flex as the bottom of the base 9 is inserted and contacts the beads 14 allowing the base 9 to be pressed downwardly into the tray until the beads 9 register with the annular flute 10. The locking of the base 9 with the tray assists in retaining the container in closed condition as illustrated in FIG. 1. It is obvious that in use of the container for air layering the tray is not used.

Figure 3:
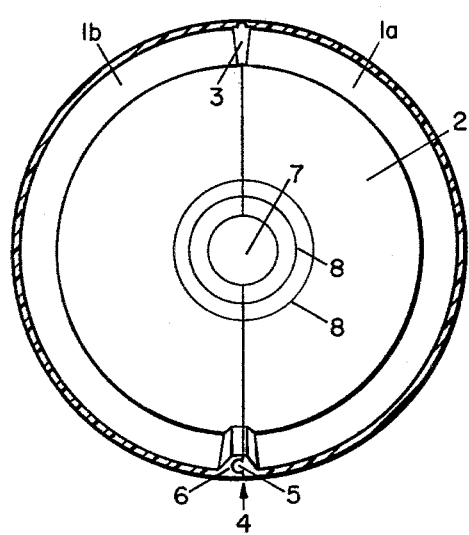
FIG. 3 is a cross-sectional view of the container taken on line 3—3 of FIG. 1.
Figure 4:
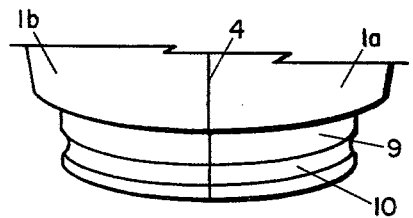
FIG. 4 is an elevational view of the lower end of the container.
Figure 6:
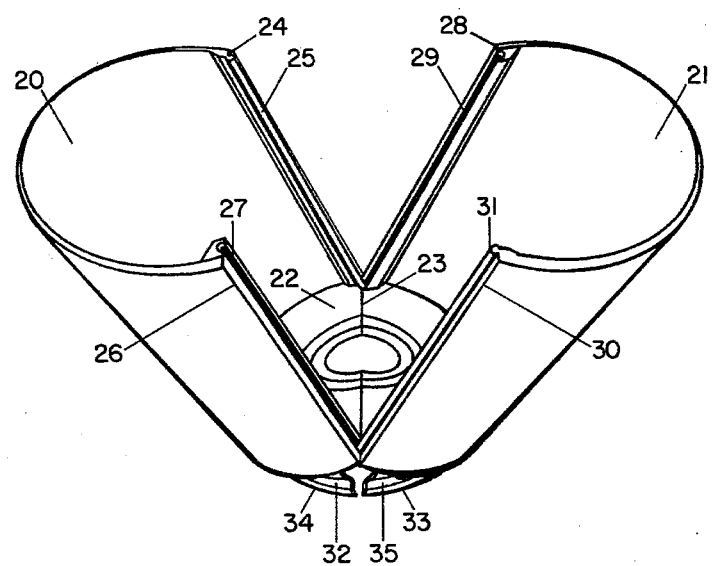
FIG. 6 is a perspective view of an alternative form of container shown in open condition.

In the modification of the container as illustrated in FIG. 6, the container is split along diametrically opposite sides so as to divide the vertical wall of the container into semi-cylindrical sections 20 and 21. The integral bottom wall 22 is formed with a living hinge 23 extending diametrically between the split sides. The hinge is of lesser thickness than that of the general thickness of the bottom wall 22 as described for the hinge 3 of FIGS. 1 and 2. The terminal edges of the semi-cylindrical sections are provided with interengaging couplings or fasteners. One of the slit edges 24 of section 20 is formed with an outwardly protruding cylindroid bead 25 whereas the other slit edge 26 is provided with a cylindroid channel or groove 27. The slit edge 28 of section 21 opposite slit edge 24 of section 20 is formed with a cylindroid channel or groove 29 whereas the other slit edge 30 opposite slit edge 26 of section 20 is formed with an outwardly protruding cylindroid bead 31. The dimensions of the beads and channels are as described in relation to the bead 5 and channel 6 of FIG. 3. It is apparent that both slit edges of one section may be provided with an outwardly protruding cylindroid bead whereas both slit edges of the other section may be provided with a cylindroid channel. The container is closed by applying sufficient pressure to the semi-cylindrical sections to force the beads into the cooperating channels.

Figure 5:
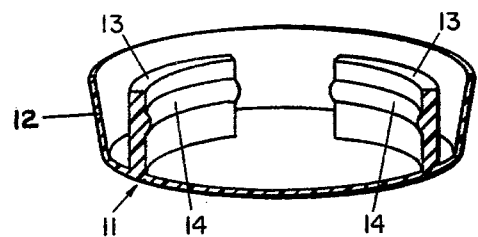
FIG. 5 is a cross-sectional view of the tray adapted to receive the container.

The bottom wall is provided with one or more drainage ports as is common in plant containers. A depending base integral with the bottom wall 22 is formed of tubular sectors 32 and 33, each sector being sufficiently less than semi-cylindrical so as to permit the semicircular sections of the bottom wall 22 to be flexed to about 90° to each other. The tubular sectors 32 and 33 are formed with an annular flute 34 and 35, respectively, in their exterior surface. The external diameter of the tubular sectors 32 and 33 is somewhat smaller than the internal diameter of the tubular sectors 13 of the tray 11 (FIG. 5). Thus the depending base may be inserted into the sectors 13 of the tray 11 until the bead 14 on the internal surfaces of sectors 13 register with the annular flutes 34 and 35. The tray is thereby locked on the depending base and assists in retaining the container in closed condition.

The opening and closing of the container are simple operations. It is obvious that the container is molded in an open condition as illustrated in FIGS. 2 and 6. The semi-cylindrical sections 1a and 1b (FIG. 2) are pivoted on the living hinge 3 to bring the slit edges toward each other. Cylindroid bead 5 is forced into groove 6 by the application of pressure to the sections. The semi-cylindrical sections 20 and 21 (FIG. 6) are pivoted on living hinge 23 in a folding action. The cylindroid beads are forced into the respective cooperating grooves. In the closing of both illustrated forms of container, the application of pressure to the sides is progressively moved from the bottom of the container toward the top until the entire length of the bead is forced into the cooperating groove. The container is preferably then mounted on a tray 11. In the opening of the container, if it has been mounted on a tray, the container is separated from the tray. The beads are withdrawn from the cylindroid grooves by a pulling force applied between the semi-cylindrical sections of the container. Where a plant is to be removed, the vertical walls of the container are thus withdrawn from the root ball and the bottom wall separated from the root ball.

In the use of the container for the air layering propagation of plants, after the desired stem or branch of the plant has been selected an appropriate circular area adapted to encompass the stem or branch is removed from the bottom wall 2 of the container. The container is placed about the stem with the base 2 positioned below the wounded portion of the stem and the container closed. If desired, a suitable mastic may be applied to the stem where the stem projects from the bottom wall 2. Moist rooting medium is then packed in the container about the stem. If desired, a loosely fitting cover may be placed over the rooting medium. It is essential that the rooting medium is maintained in moist condition until roots have developed. Following the formation of the required roots, the stem or branch is severed from the plant adjacent the exterior of the bottom wall of the container. The walls of the container are separated from the root ball by applying a pulling force between the sections of the vertical wall of the container adjacent the wall closure or coupling.

In the conventional air layering technique, the rooting medium is usually covered with a dark colored plastic sheet. In order to determine the condition of the rooting medium it is necessary to loosen the upper binding securing the plastic sheet to the stem and open the package. Such action frequently results is dislodging of the rooting medium and disturbing any roots that may have formed. Where it is found that sufficient moisture is not present, water is added and the plastic sheet again wrapped about the rooting medium and bound to the stem. The use of the present type of container is of particular advantage in the ability to continuously monitor the condition of the rooting medium without disturbing the rooting medium. Where additional water is required it is merely trickled on the rooting medium. It is thereby possible to allow required root development without disturbing the rooting medium and the roots.

Any desired decoration, indicia or ornamentation may be applied to the container or may be formed on or in the wall of the container during the molding operation. It is obvious that in molding, handles may be formed at or adjacent the top of the walls. Reference to semi-cylindrical wall sections has been used so as to simplify the description. It is obvious that the container may have a cylindrical wall, or may be in the form of conventional truncated conical configuration. Although the container has been illustrated as having a circular cross-section, it is obvious that it may have a square or hexagonal cross-section. The form as illustrated is a preferred configuration.

What is claimed is:

1. A plant container molded from a thermoplastic polymer and comprising a generally tubular vertical wall, an integral bottom wall and a portion of a wall being of lesser thickness constituting a living hinge coextensive with the wall, the vertical wall having a slit along at least one side, an outwardly extending cylindroid bead integral with said vertical wall along one slit edge, the opposed slit edge having a cooperating cylindroid groove, the dimension between the lips of said groove being smaller than the diameter of said bead and adapted to receive said bead and form a liquid-tight separable closure, said living hinge permitting said bead to be withdrawn from said groove and said slit edges to be separated, said bottom wall having a centrally located drainage port therein and having at least one concentric circular area defined by a ring of lesser thickness than said bottom wall molded into said bottom wall whereby said circular area may be pressed from said bottom wall, a tubular base integral with and extending downwardly from said bottom wall, the tubular base having an annular flute in its exterior surface, the tubular base being adapted to be positioned in a cup-shaped tray having upwardly projecting sectors, the internal diameter of said sectors being greater than the external diameter of said tubular base, said sectors having a bead on the internal surface of said sectors, the beads being adapted to register with said flute in said base.

2. A plant container as defined in claim 1 wherein the vertical wall has a slit along one side, the living hinge extends along a diametrically opposite side of the vertical wall and said bottom wall having a slit extending from said living hinge to said slit in the vertical wall.

3. A plant container as defined in claim 1 wherein said bottom wall has a plurality of concentric circular areas defined by rings of lesser thickness than said bottom wall molded into said bottom wall whereby a selected area may be pressed from said bottom wall.

4. A plant container as defined in claim 1 wherein the vertical wall has a pair of slits in diametrically opposite sides and said living hinge is located in said bottom wall and extends between said slits dividing said bottom wall into semi-circular sections.

5. A plant container as defined in claim 4 wherein a tubular base consisting of tubular sectors extends downwardly from said bottom wall, said sectors being sufficiently less than semi-cylindrical so as to permit said semi-circular sections of said bottom wall to be flexed to about 90° to each other.

6. A plant container as defined in claim 5 wherein said downwardly extending sectors have an annular flute in their exterior surface and said tubular base is positioned in a cup-shaped tray, upwardly projecting sectors with said tray having a bead on the internal surface of said sectors, the beads registering with said flutes in said base.

* * * * *